Patented Nov. 4, 1924.

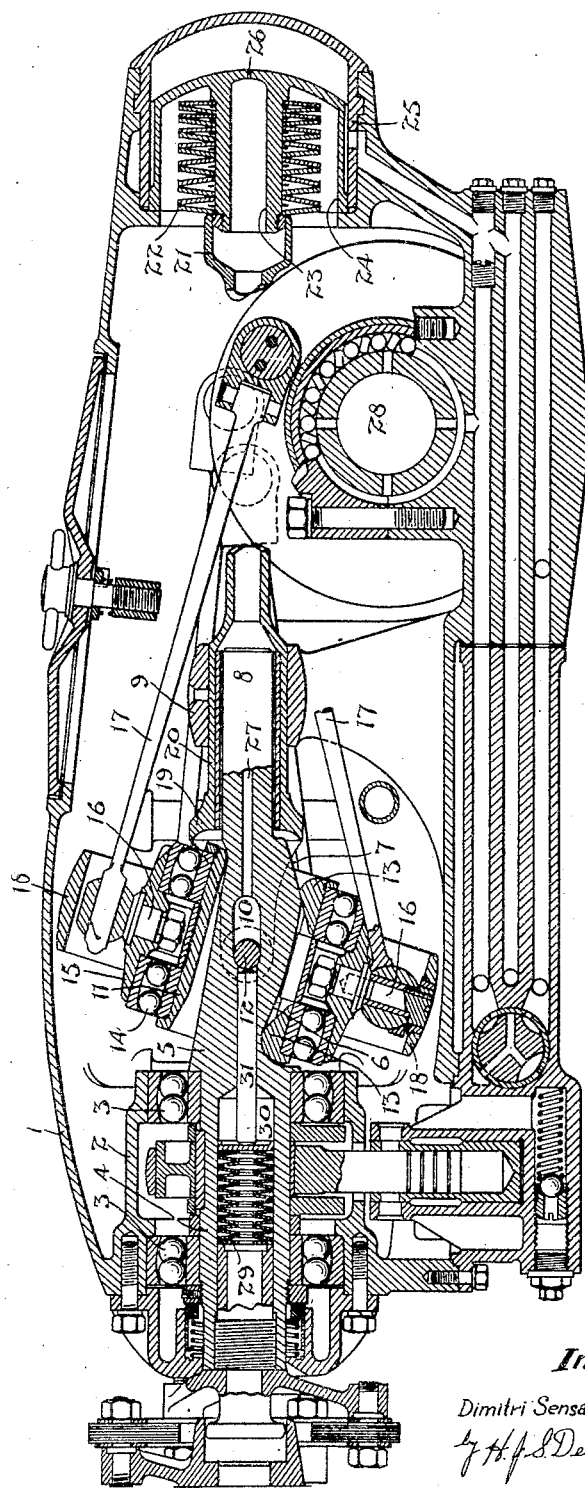

1,513,748

UNITED STATES PATENT OFFICE.

DIMITRI SENSAUD DE LAVAUD, OF PARIS, FRANCE.

VARIABLE-SPEED TRANSMISSION.

Application filed January 21, 1924. Serial No. 687,639½.

*To all whom it may concern:*

Be it known that I, DIMITRI SENSAUD DE LAVAUD, a citizen of the United States of Brazil, and resident of the city of Paris, in the Republic of France, have invented certain new and useful Improvements in Variable-Speed Transmission, as described in the following specification and illustrated in the accompanying drawing that forms part of the same.

The principal objects of this invention are to improve the construction of that type of transmission mechanism which utilizes an oscillatable member rotatably connected with the drive shaft to operate a plurality of reciprocable members to impart motion to the driven shaft, particularly in the suppression of transmission knocks and vibrations, and in reducing wear due to longitudinal thrusts, and further to ensure proper lubrication of the working parts.

The principal features of the invention consist in the novel construction and arrangement of an extension of the driving shaft connected with the oscillatable member in co-operation with a flexible resisting couple adapted to absorb the shocks of transmission, and of the arrangement of an opposing elastic couple to oppose the reaction of the principal resisting couple.

A further feature consists in the construction of the drive shaft and the rotating oscillatable member to assist in the angular displacement of said oscillatable member.

A still further feature consists in constructing the device to utilize the longitudinal displacement of the drive shaft extension to distribute oil to the working parts.

The accompanying drawing is an illustration in longitudinal section of a mechanism constructed in accord with this invention.

In the construction herein illustrated, the casing 1 has arranged at one end a cylindrical boss 2 supporting the ball bearings 3 which rotatably support the driving shaft 4 against longitudinal movement.

The portion 5 of the drive shaft extending inwardly from the bearings 3 is formed with cam surfaces 6 and 7 arranged in angular relation to the axis of the shaft and the innermost end 8 extends into a journal 9 fixed in the casing 1.

A slot 10 arranged axially of the shaft 5 extends transversely therethrough and is positioned between the cam surfaces 6 and 7.

A sleeve 11 encircling the portion 5 of the shaft is supported by a diametrically arranged pin 12 which extends through the slot 10 and is slidable longitudinally thereof. Bearing blocks 13 are secured in the ends of the sleeve 11 and these are formed with rounded surfaces which bear against the cams 6 and 7 so that when the sleeve is shifted longitudinally the cams will cause the sleeve to be shifted in its axial relation to the shaft.

Ball bearings 14 are arranged upon the sleeve 11 and upon these bearings is mounted a ring 15 which carries a plurality of radial studs 16 to which the transmission rods 17 are connected.

Two of the studs 16 arranged diametrically opposite are rotatably connected to a ring 18 encircling the ring 15 and this outer ring is provided with outwardly projecting studs, not shown, which are journalled in the ends of a fork 19 which is formed with a sleeve extension 20 encircling the end 8 of the shaft 4 and is journaled in the bearing 9.

The sleeve 20 extends rearwardly beyond the bearing 9 and is provided with an enlarged cylindrical end 21 which engages the elastic couple formed by a plurality of Belleville discs 22. These discs are mounted on the hollow stem 23 of a piston 24 arranged in the cylinder 25 secured in the rear end of the casing 1. The cylinder 25 is charged with oil and a small orifice 26 in the head of the piston admits oil to the hollow stem and the sleeve 20 which carries the oil to the shaft end 8. A central hole 27 in the shaft end 8 conducts oil to the slot 10 thereby lubricating the slot and pin 12 and also the cams 6 and 7.

The rods 17 are flexibly coupled to the ratchet mechanism for operating the driven shaft 28 consequently the shocks of transmission carried by said rods are conveyed to the ring 18 and through the fork 19 supporting the ring and the sleeve 20 to the resisting couple which absorbs same. The resisting couple is cushioned on the piston 24 against the oil in the cylinder 25 and the pressure on the piston forces oil through the tube to lubricate the parts.

In order to obviate vibration through the reaction of the resisting couple 22 a resisting couple 29 of smaller dimensions than the couple 22 is located in an axial recess 30 in the shaft 4 and a rod 31 extends through the shaft and engages the pin 12 operating in the slot 10.

It will be understood from this description that as the torque in the driven shaft increases the pull upon the rods 17 will increase, consequently the ring 11 is pulled rearwardly and the blocks 13 engaging the cams 6 and 7 effect a change in the axial disposition of the oscillating member. The variability of the pull on the rods is equalized by the main resisting couple and the result is that vibration throughout the whole mechanism is reduced to the minimum.

What I claim as my invention is:—

1. In a variable speed transmission, the combination with the driving and driven shafts and an oscillating member rotatable with the driving shaft and movable longitudinally and operatively connected with the driven shaft, of a slidable member pivotally connected to the oscillatable member, a flexible resisting member engaging said slidable member, cams on the driving shaft engaging the oscillatable member, and a flexible resisting member operatively engaging the oscillating member to oppose the reaction of the aforesaid resisting member.

2. In a variable speed transmission, the combination with the driving and driven shafts and an oscillating member rotatable with the driving shaft and movable longitudinally and operatively connected with the driven shaft, of a slidable member pivotally connected to the oscillatable member, a flexible resisting member engaging said slidable member, a yielding member supporting said resisting member, a fluid chamber adjacent to said yielding member, and means for conducting fluid lubricant from said chamber to the axis of said oscillatable member.

3. In a variable speed transmission, the combination with the driving and driven shafts and an oscillating member rotatable with the driving shaft and movable longitudinally and operatively connected with the driven shaft, of a slidable member pivotally connected to the oscillatable member, a flexible resisting member engaging said slidable member, a cylinder, a piston in said cylinder supporting said resisting member and having an orifice in its head, and a conduit through said slidable member leading to the axis of the oscillatable member.

4. In a variable speed transmission, the combination with the driving and driven shafts and an oscillating member rotatable with the driving shaft and movable longitudinally and operatively connected with the driven shaft, of a slidable member pivotally connected to the oscillatable member, a flexible resisting member engaging said slidable member, cams on the driving shaft engaging the oscillatable member, a flexible resisting member housed in the driving shaft, and a rod slidably arranged in said shaft between the latter resisting member and the pivotal support of the oscillatable member.

5. In a variable speed transmission, a driving shaft having an axial slot and cam faces, a pin slidable in said slot, a disc pivotally supported on said pin and having blocks engaging said cam faces, a yoke pivotally connected to said oscillatable member having a sleeve extension arranged in axial alignment with the shaft, a flexible resisting member engaging said sleeve, a piston supporting said resisting member, a cylinder supporting said piston, fluid lubricant in said piston, an orifice in said piston to conduct lubricant to said sleeve, a duct in the driving shaft conducting lubricant to said slot, a driven shaft, and means for connecting said oscillatable member with said driven shaft.

DIMITRI SENSAUD de LAVAUD.